United States Patent
Moyna

(10) Patent No.: US 6,769,859 B2
(45) Date of Patent: Aug. 3, 2004

(54) APPARATUS AND METHOD OF MULTI-ACTUATOR EJECTION MECHANISM

(75) Inventor: John P. Moyna, Elkader, IA (US)

(73) Assignee: Caterpillar S.A.R. L., Geneva ( * ) Notice: Subject to any disclaimer, the term of this patent is extended or adjusted under 35 U.S.C. 154(b) by 149 days.

(21) Appl. No.: 10/094,486

(22) Filed: Mar. 8, 2002

(65) Prior Publication Data

US 2003/0170101 A1 Sep. 11, 2003

(51) Int. Cl.$^7$ ................................................. B60P 1/00
(52) U.S. Cl. ........................ 414/517; 414/513; 414/813
(58) Field of Search ................................ 414/511, 512, 414/517, 521, 813

(56) References Cited

U.S. PATENT DOCUMENTS

| | | |
|---|---|---|
| 3,815,764 A | 6/1974 | Gilfillan et al. |
| 3,953,170 A | 4/1976 | Webb |
| 4,057,157 A | 11/1977 | Park et al. |
| 4,071,153 A | 1/1978 | Booher |
| 4,260,317 A | 4/1981 | Martin et al. |
| 4,516,904 A | 5/1985 | Simmons |
| 4,522,551 A | 6/1985 | Henneberry |
| 4,627,783 A | * 12/1986 | De Filippi .................. 414/517 |
| 4,632,628 A | * 12/1986 | Kress et al. ................ 414/513 |
| 4,690,607 A | 9/1987 | Johnson |
| 5,456,521 A | 10/1995 | Moyna |
| 5,518,287 A | 5/1996 | Totani |
| 5,702,227 A | 12/1997 | Berg |
| 5,785,487 A | 7/1998 | McNeilus et al. |
| 5,816,766 A | 10/1998 | Clark |
| 6,007,291 A | 12/1999 | Ghibaudo |
| 6,059,513 A | 5/2000 | Goby |
| 6,062,804 A | 5/2000 | Young et al. |
| 6,079,933 A | 6/2000 | Moyna et al. |
| 6,102,644 A | 8/2000 | Young et al. |
| 6,146,078 A | 11/2000 | Hamill et al. |
| 6,146,079 A | 11/2000 | Ghibaudo |
| 6,155,776 A | 12/2000 | Moyna |
| 6,176,673 B1 | 1/2001 | Moyna et al. |

* cited by examiner

Primary Examiner—Eileen D. Lillis
Assistant Examiner—Thuy V. Tran
(74) Attorney, Agent, or Firm—James R Smith

(57) ABSTRACT

An ejector truck requires an ejector mechanism to remove hauled material from the ejector truck body. Often, these ejector mechanisms are costly and require precise manufacturing and maintenance because they include a telescoping linear actuator. The present invention provides a method and apparatus of a multi-actuator ejection mechanism. The multi-actuator ejection mechanism includes an anchor member, an ejection carriage, an ejector blade, a first linear actuator, and a second linear actuator. The ejector blade is located a predetermined distance from the anchor member and is adapted to move longitudinally with respect to the anchor member. The first linear actuator has a first end secured to the anchor member and a second end secured to the ejection carriage, and is adapted to move the ejection carriage longitudinally with respect to the anchor member. The second linear actuator has a first end secured to the ejection carriage and a second end secured to the ejector blade, and is adapted to move the ejector blade with respect to the ejection carriage. The multi-actuator ejection mechanism of the present invention uses multiple single-stage linear actuators instead of a single telescoping/multiple-stage linear actuator.

12 Claims, 4 Drawing Sheets

APPARATUS AND METHOD OF MULTI-ACTUATOR EJECTION MECHANISM

TECHNICAL FIELD

The present invention relates to an ejection mechanism to remove hauled material from a hauling body and, more particularly, to such a mechanism which is actuated in multiple steps.

BACKGROUND

Articulated trucks are commonly used in industry to haul material from one location and spread it in another location. Articulated trucks dump the hauled material either by tilting the body of the truck or by ejecting the material with a mechanized pusher/ejector blade. Ejector trucks are useful in many applications where a traditional tilting dump truck is undesirable or impractical. For instance, if there are power lines or a low bridge or other structure located above the worksite, the ejector truck can dump its load without contacting the overhead obstruction as would a tilting dump truck. Also, an ejector truck can spread the dumped material more easily and accurately than can a gravity-powered tilting dump truck, since the powered ejector blade gives the operator a great deal of control over the flow rate of the material.

Ejecting the hauled material from the truck is currently accomplished using a multi-part telescoping hydraulic cylinder to push an ejector blade from the front of the body to the rear of the body in a known manner. These designs have worked well, but could be improved. The telescoping hydraulic cylinder is very expensive to manufacture, operate, and maintain. It requires a large amount of hydraulic fluid to fully extend, with all of the accompanying fluid supply and routing issues. The dimensions of, and clearances between, the telescoping sections must be very precise, and there are multiple sections needed to extend the cylinder to empty the truck totally, with each of those sections requiring meticulous machining and assembly. The cylinder will not function as desired if dirt, debris, or other hauled material spills over the ejector blade and scratches or dents the telescoping sections. Also, the extreme length of the extended telescoping cylinder makes it more likely to sag in the unsupported midsection. Over time, such sagging could bend the sections slightly, thus ruining the precise alignment of the sections.

The present invention is directed to overcoming one or more of these complications by providing a method and apparatus of a multi-actuator ejection mechanism which: is protected from spillover material; uses common, simple components; includes intermediate support for the linear actuators; and is economical to manufacture and use.

SUMMARY OF THE INVENTION

In an embodiment of the present invention, a multi-actuator ejection mechanism is provided. The multi-actuator ejection mechanism includes an anchor member, an ejection carriage, an ejector blade, a first linear actuator, and a second linear actuator. The ejector blade is located a predetermined distance from the anchor member and is adapted to move longitudinally with respect to the anchor member. The first linear actuator has a first end secured to the anchor member and a second end secured to the ejection carriage, and is adapted to move the ejection carriage longitudinally with respect to the anchor member. The second linear actuator has a first end secured to the ejection carriage and a second end secured to the ejector blade, and is adapted to move the ejector blade with respect to the ejection carriage.

In an embodiment of the present invention, a method for providing a multi-actuator ejection mechanism to an ejector body is provided. The method includes the steps of extending a first linear actuator, moving an ejector carriage from a first carriage position to a second carriage position, moving an ejector blade from a first blade position to a second blade position, extending a second linear actuator, and moving the ejector blade from the second blade position to a third blade position.

In an embodiment of the present invention, a multi-actuator ejector trailer is provided. The multi-actuator ejector trailer includes a trailer body, a ground-engaging device attached to trailer body and adapted to provide motive means to the trailer body, and an ejector mechanism attached to a forward portion of the trailer body. The ejector mechanism includes an ejector blade, an anchor member, an ejector carriage, a first linear actuator, and a second linear actuator. The ejector blade is located on top of the trailer body and is adapted to move from the forward portion of the trailer body to a rearward portion of the trailer body. The anchor member is located forward of the ejector blade and is substantially fixed in position. The ejector carriage is located between the ejector blade and the anchor member and adapted to move from a forward position near the anchor member to a rearward position near the ejector blade. The first linear actuator is located between the anchor member and the ejector carriage, attached to the anchor member and the ejector carriage, and operative to move the ejector carriage with respect to the anchor member. The second linear actuator is located between the ejector carriage and the ejector blade, attached to the ejector carriage and the ejector blade, and operative to move the ejector blade with respect to the ejector carriage.

DETAILED DESCRIPTION

A preferred embodiment of the present invention provides an apparatus and method of a multi-actuator ejection mechanism. The following description uses an articulated truck as an example only. This invention may be applied to other types of work machines, either installed as a part of the work machine or as a separate entity in some sort of towed or pushed arrangement with an articulated truck, a wheeled tractor, a track-type tractor, a belted tractor, or any other suitable work machine or machine body.

Figure 1:
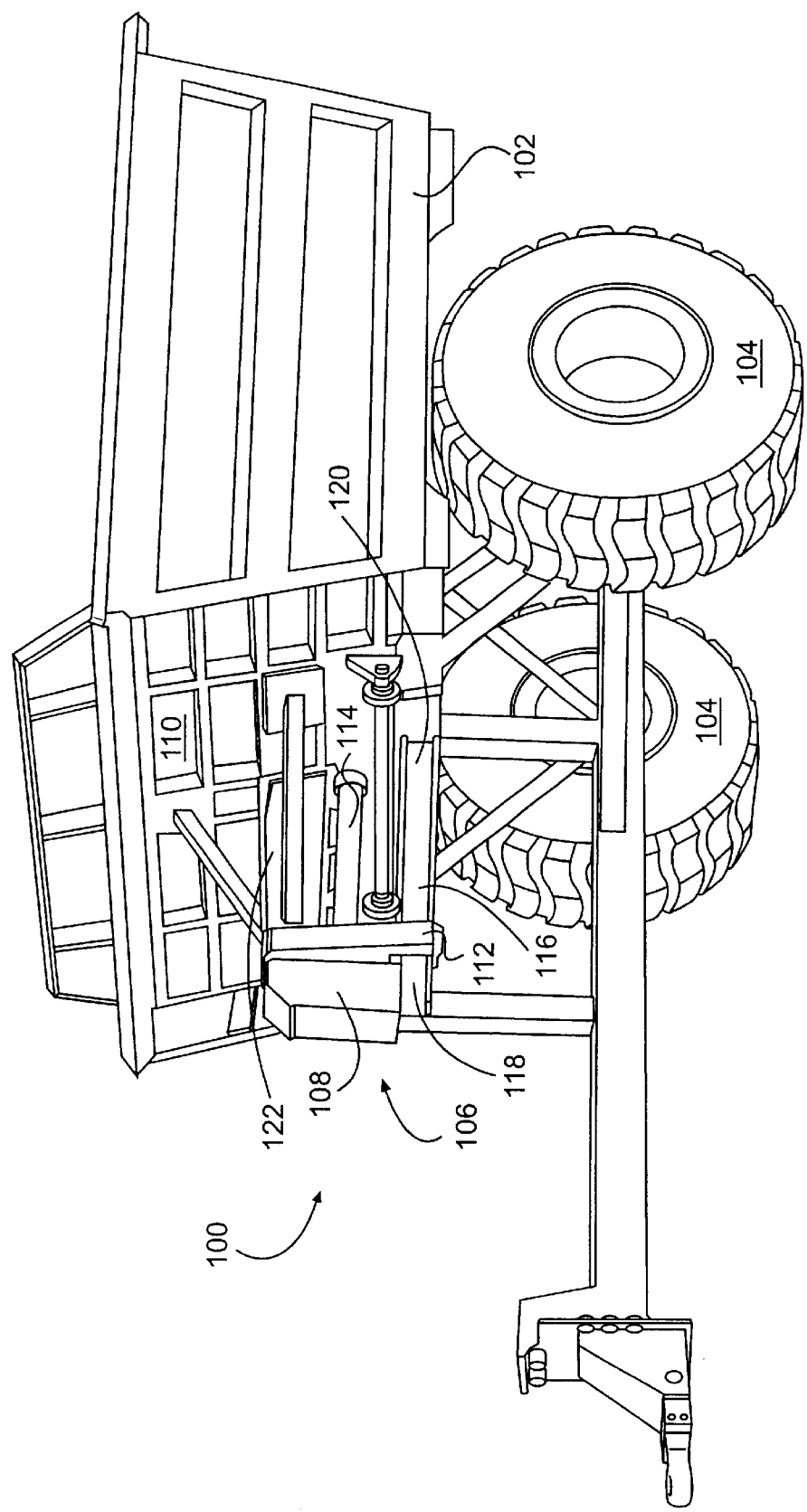
FIG. 1 is a perspective view of an ejector trailer according to the present invention.

FIG. 1 depicts an ejector trailer 100 according to the present invention. The trailer comprises a trailer body 102, a pair of ground-engaging devices 104 supporting the trailer body 102, and a multi-actuator ejection mechanism, shown generally at 106. The ground-engaging devices 104 may be pneumatic tires as illustrated but may be any other suitable structure such as the rubber-belted undercarriage available from Caterpillar Inc. under the brand name Mobil-trac™.

The trailer body 102 shown in FIG. 1 is typical of the type of hauling bed or body with which the present invention can be utilized. A typical hauling body has two opposing sides and a bottom having a first bottom end and a second bottom end spaced longitudinally from the first bottom end. The multi-actuator ejection mechanism 106 of the present invention may be used with any suitable body used to haul material, whether that body is mounted on or pulled behind a truck, pushed ahead of a truck, or any other suitable arrangement, without departing from the spirit and scope of the present invention.

Figure 2:
FIG. 2 is a perspective view of a multi-actuator ejection mechanism according to the present invention situated in a fully retracted position.
Figure 3:
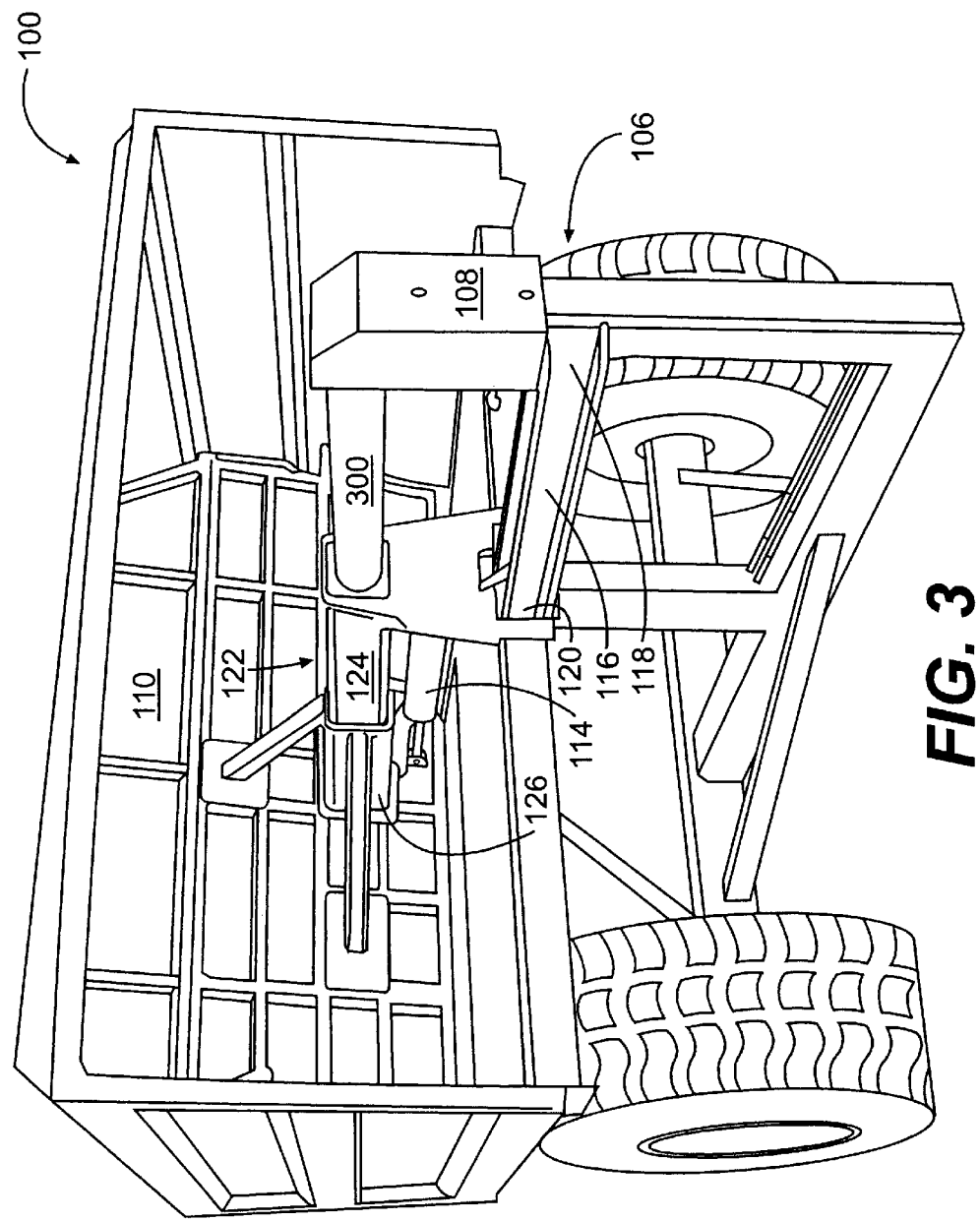
FIG. 3 is a perspective view of a multi-actuator ejection mechanism according to the present invention situated in a fully extended position.

The multi-actuator ejection mechanism 106 is shown in FIGS. 1, 2, and 3, and comprises an anchor member 108, an ejector blade 110, an ejection carriage 112, a first linear actuator 300 (FIG. 3), and a second linear actuator 114. The anchor member 108 is an anchor in the sense of providing a fixed point with respect to which other components of the multi-actuator ejection mechanism move or by which other components are supported. The first linear actuator 300 connects the anchor member 108 and the ejection carriage 112. The second linear actuator 114 connects the ejection carriage 112 and the ejector blade 110. The linear actuators are preferably extendible and may be a hydraulic cylinder, pneumatic piston device, telescoping "multi-stage" cylinder, or the like.

The multi-actuator ejection mechanism 106 may include an ejection track 116 having a first track end 118 connected to the anchor member and a second track end 120 spaced longitudinally from the first track end 118. Should the multi-actuator ejection mechanism 106 include such an ejection track 116, the ejection carriage 112 will be adapted to move along the ejection track 116. By "move along", what is meant is that the ejection carriage 112 is preferably guided by the ejection track 116 and may be supported by the ejection track 116, and the ejection carriage 112 moves in a controllable manner between the first track end 118 and the second track end 120. This motion may be done in a sliding, rolling, ratcheting, or other suitable manner, as the exact type of motion is not essential to the present invention. Optionally, the supporting or guiding functions could be accomplished by another suitable structure without departing from the spirit of the present invention.

The first and second linear actuators 300, 114 may be single- or multi-stage hydraulic cylinders. It would then be desirable for a power provider (not shown) to supply pressurized hydraulic fluid to the first and second linear actuators 300, 114 in order to extend or retract the first and second linear actuators 300, 114 in a known manner.

The first linear actuator 300 may be substantially enclosed by a first piston shroud system 122. The first piston shroud system 122 comprises an inner tube 124 substantially surrounding the first piston 300 when the multi-actuator ejection mechanism 106 is in a retracted position, and an outer tube 126 substantially surrounding the inner tube 124 when the multi-actuator ejection mechanism 106 is in a retracted position. The inner tube 124 and outer tube 126 are able to be moved in a telescoping manner with respect to one another and to the first piston 300. Such motion is mainly in a longitudinal direction. The inner tube 124 may be secured to one of the anchor member 108 and the ejection carriage 112, and the outer tube 126 may be secured to the other of the anchor member 108 and the ejection carriage 112, to facilitate the relative telescopic motion of the inner tube 124 and the outer tube 126.

While aspects of the present invention have been particularly shown and described with reference to the preferred embodiment above, it will be understood by those skilled in the art that various additional embodiments may be contemplated without departing from the spirit and scope of the present invention. For example, the linear actuators could be controlled or powered in a different manner, there could be additional coupling mechanisms than those described, or the configuration of the ejector truck and trailer could be different. However, a device or method incorporating such an embodiment should be understood to fall within the scope of the present invention as determined based upon the claims below and any equivalents thereof.

Industrial Applicability

In the field, the present invention will be utilized much as the prior art ejector trucks. That is, an operator will control the movement of the ejector blade to push the hauled material out of the trailer body in a desired manner. However, in lieu of the single lengthy multiple-section telescoping hydraulic cylinder taught by the prior art, the present invention uses a multi-actuator ejection mechanism 106 as described above.

Figure 4:
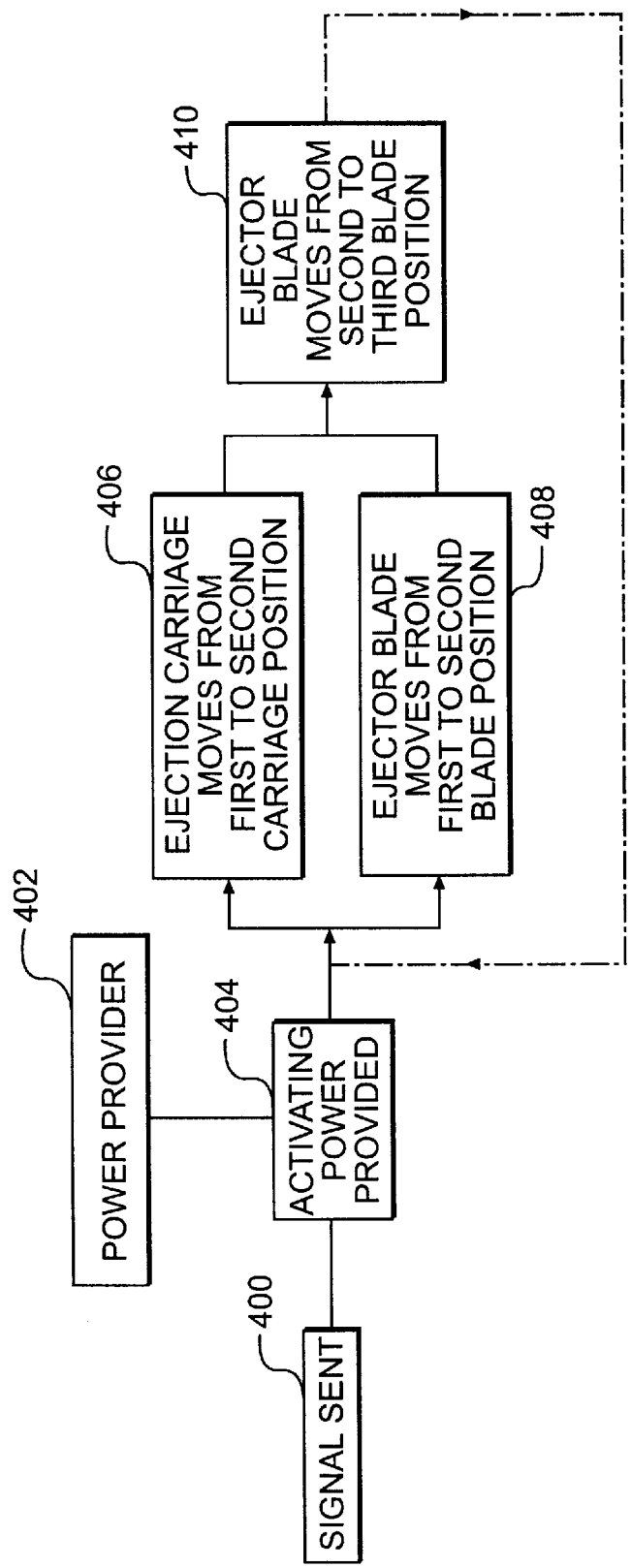
FIG. 4 is a flow chart showing the operating sequence of the present invention.

When the multi-actuator ejection mechanism 106 is in a fully retracted position, the ejector blade 110 is located in a first blade position toward a forward portion of the trailer body 102. The ejector trailer 100 can be loaded and moved in a known manner. When the operator wishes to eject the hauled material from the trailer body 102, he may either manually (as with a modulated lever or the like) or automatically (as with a push-button or the like) control the ejector function as described below and as shown in FIG. 4. The ejector trailer 100 can be stationary or moving as the ejector function runs. The ejector function may be interrupted, reversed, or stopped before it runs completely with no ill effect on the present invention. If the ejector trailer 100 is towed behind a work machine or an other ejector trailer 100 which hauls material as well and which may also be equipped with a prior art ejection mechanism and/or a multi-actuator ejection mechanism 106 according to the present invention, the rearmost ejector trailer 100 is preferably, but not necessarily, at least partially ejected before the other work machine or ejector trailer 100 is ejected/unloaded. This rear-first sequencing can provide advantages in power routing which are discussed below.

The ejector function uses a multi-actuator ejection mechanism 106 as described above. When the operator indicates that the ejector blade 110 is to push the hauled material out of the trailer body 102, a signal is sent at first block 400 (FIG. 4) which prompts the first linear actuator 300 to extend. Preferably, a power provider 402 provides actuating power to the first linear actuator at second block 404. This extension pushes the ejection carriage 112 away from the anchor member 108, moving the ejection carriage 112 from a first carriage position to a second carriage position at third block 406. The extension of the first linear actuator 300 also moves the ejection carriage 112 along the ejection track 116, should one be provided. If a first piston shroud system 122 is provided, the inner tube 124 and the outer tube 126 are moved one relative to the other in a telescoping fashion by the extension of the first linear actuator 300, as well. Since the ejection carriage 112 is connected to the ejector blade 110 via the (retracted) second linear actuator 114, the ejector blade 110 moves from a first, or fully retracted, blade position to a second blade position through the extension of the first linear actuator 300 as shown at fourth block 408.

Either simultaneously with, before, or after the extension of the first linear actuator 300, the second linear actuator 114 extends. Actuating power for the second linear actuator 114 may also be provided by the power provider and is not shown separately in FIG. 4. Since the second linear actuator 114 connects the ejection carriage 112 and the ejector blade 110, the extension of the second linear actuator 114 moves the ejector blade 110 away from the ejection carriage 112 and from a second blade position to a third, or fully extended, blade position at fifth block 410. FIG. 4 depicts fifth block 410 occurring after fourth block 408, but this placement is merely for ease of depiction and the fifth block 410 may occur at any suitable timing. The multi-actuator ejection mechanism 106 and the trailer body 102 should be sized and arranged such that movement of the ejector blade 110 to the third blade position—that is, fully extending the multi-actuator ejection mechanism 106—pushes the hauled material out of the trailer body 102, substantially emptying the trailer body 102. At this point, the ejector function has been completed.

The first, second, and third blade positions, and the first and second carriage positions, are not absolute, but depend upon the timing of the actuation of the first and second linear actuators 300, 114. The ejector blade 110 and ejection carriage 112 need not hesitate or stop at any of these positions, but may, instead, move fluidly therebetween. These blade and carriage positions are not essential to the present invention, but are provided as a guide to understanding the motion of the ejector blade 110 and ejection carriage 112, where the first blade position corresponds to the multi-actuator ejection mechanism 106 being fully retracted and the third blade position corresponds to the multi-actuator ejection mechanism 106 being fully extended.

Once the multi-actuator ejection mechanism 106 is fully extended, it must then be retracted to allow the trailer body 102 to be again filled with hauled material. To retract the multi-actuator ejection mechanism 106, the first and second linear actuators 300, 114 are retracted in any suitable order or simultaneously to effectively reverse the movements of the ejection carriage 112 and the ejector blade 110 as described above.

It is intuitively obvious that the present invention does not limit a multi-actuator ejection mechanism 106 to having only one ejector carriage 112 and first and second linear actuators 300, 114. In fact, one skilled in the art would be able to readily fabricate a multi-actuator ejection mechanism 106 having multiple ejector carriages 112 and additional linear actuators located as needed to provide a longer ejector blade travel distance than that shown and described herein, including a fourth blade position at the new extent of ejector blade travel. These multiple ejector carriages 112 and additional linear actuators may operate simultaneously or in any suitable order relative one to another. Such a system would be particularly advantageous when used on an ejector truck or a towed ejector trailer 100 having a longer trailer body 102 than the ejector trailer 100 shown in the Figs. The operation of such an arrangement is shown by a dotted line in FIG. 4, where the first and second carriage positions and first, second, and third blade positions should each be construed relative to the multiple ejector carriages 112 and additional linear actuators being actuated at that time.

In operation, an ejector trailer 100 according to the present invention is attached to a hitch, tongue, or other suitable member (as shown in FIG. 1) and pulled behind a truck cab or another ejector trailer 100, such pulling device being with or without a multi-actuator ejection mechanism 106 according to the present invention installed thereon as needed. In addition, the multi-actuator ejection mechanism 106 can be installed as a retrofit feature on any suitable prior art articulated truck or ejector truck. Though the ejector trailer 100 could include a power source integrally, the power source normally is provided by the truck cab pulling the ejector trailer(s) 100. Should the power source be hydraulic and the ejector trailer 100 including a multi-actuator ejection mechanism 106 be pulled by another ejector trailer 100, greater efficiency can be provided by allowing a return hydraulic pressure from the retracting first and second linear actuators 300, 114 to provide power to the pulling ejector trailer 100.

The steps of operation described above for the multi-actuator ejection mechanism 106 may be performed in any workable order to eject material from an ejector trailer 100 or other hauling body. Preferably but not necessarily, the first linear actuator 300 is actuated before the second linear actuator 114, which may provide power supply and routing efficiencies.

The apparatus and method of certain embodiments of the present invention protect the invention from spillover material, use common, simple components, include intermediate support for the linear actuators, and are economical to manufacture and use. In addition, the present invention may provide other features that have not yet been discovered.

It should be understood that while a preferred embodiment is described in connection with an articulated truck or ejector truck, the present invention is readily adaptable to provide similar functions for other work machines. Other aspects, objects, and advantages of the present invention can be obtained from a study of the drawings, the disclosure, and the appended claims.

What is claimed is:

1. A multi-actuator ejection mechanism for use with an ejector trailer having a trailer body, comprising:
    an anchor member positioned at least partially outside of the trailer body;
    an ejection carnage;
    an ejector blade initially located a predetermined distance from the anchor member and adapted to move longitudinally with respect to the anchor member;
    a first linear actuator having a first end secured to the anchor member and a second end secured to the ejection carriage, and adapted to move the ejection carriage longitudinally with respect to the anchor member; and
    a second linear actuator having a first end secured to the ejection carriage and a second end secured to the ejector blade, and adapted to move the ejector blade with respect to the ejection carriage.

2. The multi-actuator ejection mechanism of claim 1, further comprising an ejection track having a first track end adjacent the anchor member and a second track end longitudinally spaced from the first track end, wherein the ejection carriage is located in a contacting relationship with the ejection track and adapted to move longitudinally along the ejection track through an action of the first linear actuator.

3. The multi-actuator ejection mechanism of claim 1, further comprising a first piston shroud system having an inner tube substantially surrounding the first linear actuator and secured to one of the anchor member and the ejection carriage, and an outer tube substantially surrounding the inner tube and adapted to move longitudinally in relation thereto and secured to the other of the anchor member and the ejection carriage.

4. The multi-actuator ejection mechanism of claim 1, wherein a hauling body having two opposing sides and a bottom having a first bottom end located a predetermined distance from the anchor member and a second bottom end longitudinally spaced from the first bottom end is provided, wherein the ejector blade is located between the two opposing sides and is operative to move hauled material in a direction from the first bottom end to the second bottom end when the ejector blade is moved by the first and second linear actuators.

5. The multi-actuator ejection mechanism of claim 4, wherein the hauling body, the anchor member, the ejection carriage, and the first and second linear actuators are all carried on an ejection trailer, the ejection trailer being attached to at least one of an articulated truck cab and an articulated truck trailer.

6. The multi-actuator ejection mechanism of claim 5, wherein the ejection trailer is attached to the articulated truck cab, and the articulated truck cab provides power to the first and second linear actuators.

7. The multi-actuator ejection mechanism of claim 5, wherein the ejection trailer is attached to the articulated truck trailer, the first and second linear actuators are hydraulic pistons, the articulated truck trailer provides an actuating hydraulic pressure to extend the first and second linear actuators in a predetermined manner, and the first and second linear actuators provide a return hydraulic pressure to the articulated truck trailer as the first and second linear actuators retract during operation of the multi-actuator ejection mechanism.

8. The multi-actuator ejection mechanism of claim 1, wherein the first and second linear actuators are hydraulic cylinders and hydraulic fluid is supplied by a power provider.

9. A multi-actuator ejector trailer, comprising:

a trailer body;

a ground-engaging device attached to the trailer body and adapted to provide support to the trailer body; and an ejector mechanism attached to a forward portion of the trailer body, such ejector mechanism comprising:

an ejector blade located on top of the trailer body and adapted to move from the forward portion of the trailer body to a rearward portion of the trailer body;

an anchor member located forward of the ejector blade and being substantially fixed in position;

an ejector carriage located between the ejector blade and the anchor member and adapted to move from a forward position near the anchor member to a rearward position near the forward portion of the trailer body;

a track located between the anchor member and the trailer body and extending from a position substantially adjacent to the anchor member and terminating at a position substantially adjacent to the trailer body, wherein the ejector carriage is adapted to ride on the track;

a first linear actuator located between the anchor member and the ejector carriage, attached to the anchor member and the ejector carriage, and operative to move the ejector carriage with respect to the anchor member; and a second linear actuator located between the ejector carriage and the ejector blade, attached to the ejector carriage and the ejector blade, and operative to move the ejector blade with respect to the ejector carriage.

10. The multi-actuator ejector trailer of claim 9, further comprising a hitch member located on the forward portion of the trailer body and adapted to engage a pulling device to transmit motive power from the pulling device to the ejector trailer.

11. The multi-actuator ejection member of claim 10, wherein the ejector mechanism is located on the hitch member.

12. The multi-actuator ejector trailer of claim 10, wherein the first and second linear actuators are hydraulic cylinders, and the pulling device is adapted to provide hydraulic power to the first and second linear actuators.

* * * * *